US009549340B2

United States Patent
Beale et al.

(10) Patent No.: US 9,549,340 B2
(45) Date of Patent: Jan. 17, 2017

(54) MOBILE COMMUNICATIONS SYSTEM, INFRASTRUCTURE EQUIPMENT, BASE STATION AND METHOD

(75) Inventors: Martin Warwick Beale, Bristol (GB); Alan Jones, Calne (GB)

(73) Assignee: SCA IPLA HOLDINGS INC, New York, NY (US)

( * ) Notice: Subject to any disclaimer, the term of this patent is extended or adjusted under 35 U.S.C. 154(b) by 174 days.

(21) Appl. No.: 14/122,591

(22) PCT Filed: May 11, 2012

(86) PCT No.: PCT/GB2012/051060
§ 371 (c)(1),
(2), (4) Date: Nov. 26, 2013

(87) PCT Pub. No.: WO2012/164248
PCT Pub. Date: Dec. 6, 2012

(65) Prior Publication Data
US 2014/0112143 A1 Apr. 24, 2014

(30) Foreign Application Priority Data

May 27, 2011 (GB) .................................. 1109004.0

(51) Int. Cl.
*H04W 28/02* (2009.01)
*H04W 76/02* (2009.01)
(Continued)

(52) U.S. Cl.
CPC ......... *H04W 28/0289* (2013.01); *H04W 72/04* (2013.01); *H04W 76/025* (2013.01); *H04W 72/06* (2013.01)

(58) Field of Classification Search
CPC ............................................... H04W 28/0289
See application file for complete search history.

(56) References Cited

U.S. PATENT DOCUMENTS 7,013,156 B2 * 3/2006 Smith ................... H04W 92/02
455/466
8,432,871 B1 * 4/2013 Sarnaik et al. ............... 370/331
(Continued)

FOREIGN PATENT DOCUMENTS

| EP | 1 524 869 | 4/2005 |
| EP | 1 759 544 | 3/2007 |

(Continued)

OTHER PUBLICATIONS

International Search Report Issued Jul. 11, 2012 in PCT/GB12/051060 Filed May 11, 2012.

(Continued)

*Primary Examiner* — Brian D Nguyen
*Assistant Examiner* — Toan Nguyen
(74) *Attorney, Agent, or Firm* — Oblon, McClelland, Maier & Neustadt, L.L.P.

(57) ABSTRACT

A mobile communications system including one or more mobile communications devices and a mobile communications network, the mobile communications network including a radio network part and a core network part and being configured to communicate data packets to and/or from mobile communications devices. Data packets can be communicated to or received from the mobile communications devices using either a broadband packet network or a dedicated messaging network. The dedicated messaging network is arranged to communicate short data grams more efficiently than larger data communications. Therefore by selecting either the dedicated messaging network or the broadband network as a function of content of the data packet a more efficient use of available communications resources and hardware resources is realized.

44 Claims, 9 Drawing Sheets

(51) Int. Cl.
*H04W 72/04* (2009.01)
*H04W 72/06* (2009.01)

(56) References Cited

U.S. PATENT DOCUMENTS

| | | |
|---|---|---|
| 2002/0159414 A1 | 10/2002 | Kanemoto et al. |
| 2003/0210665 A1 | 11/2003 | Salmenkaita et al. |
| 2003/0224731 A1 | 12/2003 | Yamaura et al. |
| 2004/0192295 A1 | 9/2004 | Tsao et al. |
| 2006/0146807 A1* | 7/2006 | Codaccioni et al. ......... 370/356 |
| 2007/0070984 A1 | 3/2007 | Tseng |
| 2008/0095106 A1 | 4/2008 | Malladi et al. |
| 2008/0101278 A1* | 5/2008 | Bengtsson et al. ........... 370/328 |
| 2008/0235376 A1* | 9/2008 | Prytz et al. ................... 709/225 |
| 2010/0100957 A1* | 4/2010 | Graham et al. ................ 726/22 |
| 2010/0296498 A1 | 11/2010 | Karaoguz et al. |

FOREIGN PATENT DOCUMENTS

| | | |
|---|---|---|
| EP | 2 254 382 | 11/2010 |
| EP | 2 288 045 | 2/2011 |
| GB | 2 467 447 | 8/2010 |
| WO | 2007 015820 | 2/2007 |
| WO | 2009/101994 A1 | 8/2009 |

OTHER PUBLICATIONS

Great Britain Search Report Issued Sep. 15, 2011 in GB 1109004.0 filed May 27, 2011.
Office Action mailed Mar. 1, 2016 in Japanese Patent Application No. 2014-513241.

* cited by examiner

MOBILE COMMUNICATIONS SYSTEM, INFRASTRUCTURE EQUIPMENT, BASE STATION AND METHOD

CROSS-REFERENCE TO RELATED APPLICATIONS

The present application claims priority to British Patent Application 1109004.0, filed in the UK IPO on May 27, 2011, the entire contents of which are incorporated herein by reference.

FIELD OF THE INVENTION

The present invention relates to mobile communications systems for communicating data packets to and/or from mobile communications devices, infrastructure equipment, base stations, mobile communications devices and methods for communicating data packets.

BACKGROUND OF THE INVENTION

Mobile communication systems have evolved over the past ten years or so from the GSM System (Global System for Mobiles) to the 3G system and now include packet data communications as well as circuit switched communications. The third generation partnership project (3GPP) has now began to develop a fourth generation mobile communication system referred to as Long Term Evolution (LTE) in which a core network part has been evolved to form a more simplified architecture based on a merging of components of earlier mobile communications network architectures and a radio access interface which is based on Orthogonal Frequency Division Multiplexing (OFDM) on the downlink and Single Carrier Frequency Division Multiple Access (SC-FDMA) on the uplink. The core network components are arranged to communicate data packets in accordance with an enhanced packet communications system.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. Third and fourth generation mobile communication networks therefore typically employ advanced data modulation techniques on the radio interface which can require more complex and expensive radio transceivers to implement. However not all communications are of a nature which requires the full bandwidth capability of for example the LTE system. Accordingly, it is may be more appropriate to adopt a technique which communicates some types of data as more efficiently than using the full-bandwidth capability of a mobile communications system.

SUMMARY OF THE INVENTION

According to the present invention there is provided a mobile communications system comprising one or more mobile communications devices and a mobile communications network for communicating data packets to and/or from mobile communications devices. The mobile communications network includes a radio network part and a core network part. The radio network part includes one or more base stations for communicating the data packets to or receiving the data packets from the mobile communications devices via a radio access interface, and the core network part comprises one or more infrastructure components for communicating the data packets to or receiving the data packets from the base stations of the radio network part. The core network part and the radio network part are configured to provide a broadband packet network which is adapted to communicate the data packets to or receive from the mobile communications devices in accordance with a relatively high bandwidth, and to provide contemporaneously a dedicated messaging network which is adapted to communicate the data packets to or receive from the mobile communications devices in accordance with a relatively low bandwidth, and one or more of the mobile communications device, the base station or the infrastructure equipment is configured to determine whether to communicate each of the data packets via either the broadband packet network or the dedicated messaging network in accordance with predetermined criteria. The data packets are therefore communicated to or received from the mobile communications devices using either the broadband packet network or a dedicated messaging network. In one example the broadband packet network is provided from a full bandwidth capability of the mobile communications network and the dedicated messaging network may be provided by a reduced bandwidth of the mobile communications network.

In one example one or both of the mobile communications device and the base station is configured to parse the data packets for communication to determine whether the data packet contains signalling data or user data in accordance with the predetermined criteria, and if the data packet contains signalling data, communicating the data packet using the dedicated messaging network, and if the data packet contain user data communicating the data packet via the broadband network. The predetermined criteria may include one or more of a protocol type, an application type, a domain name, a socket or port number of the data packets.

The dedicated messaging network is arranged to communicate short data-grams more efficiently than larger data communications. The dedicated messaging network is better arranged to communicate short data-grams than the broadband packet network. Therefore by selecting either the dedicated messaging network or the broadband network as a function of the content of the data packet, a more efficient use of available communications resource, infrastructure equipment and mobile communications devices is provided. For example, if the data packets are communicating signalling data, then since a quantity and frequency of occurrence of this data is relatively low, the signalling data may be communicated more efficiently via a dedicated messaging network.

Mobile communications devices such as smart-phones and portable computers transmit many application level signalling messages, such as data request, keep-alive and polling type messages on a mobile communications network. These signalling-type messages are related to certain machine-like applications that are running on the smart-phone or portable computer. The inventors have recognised that these messages and data-grams may be more efficiently communicated by a dedicated messaging network (DMN). The DMN may be characterized as being adapted to communicate relatively small messages more efficiently compared with a conventional broadband wireless communications network. For example, the DMN may support more Physical Downlink Control Channels (PDCCH) per subframe, for example by possibly reducing the size of the conventional PDCCH. In another example the DMN may be adapted to support a greater amount of Random Access Channel (RACH) resource, which may be useful for mobile devices that are not permanently connected to the DMN, but communicate in a connectionless manner. In one example the DMN may be a virtual carrier that sits within the bandwidth of a host carrier or the broadband packet network. Thus the broadband packet network may be formed from the mobile communications network, which may be an LTE network, using for example substantially the full bandwidth capability of the LTE network, whereas the DMN may be formed from a reduced bandwidth of the LTE network, which is less than the total bandwidth available.

The broadband packet network is therefore appropriate for communicating larger amounts of data at high speed. The broadband packet network could be a High Speed Packet Access communications network for example as supported by a UMTS or an LTE network. In contrast to the DMN, the broadband packet network may have a restricted amount of available signalling resource in comparison to the amount of user-data resource. As such broadband packet networks may be overloaded by the application signalling messages from smart-phone applications, and as a result it is possible that all of a network resource which has been assigned to convey control information of the broadband packet network is used before the user-data portion is completely assigned.

In one example separate applications in the mobile communications device are connected to either the DMN or the broadband packet network as a function of a type of the application program.

In one example embodiment one of the base station or the infrastructure equipment is configured to monitor an amount of demand for signalling type data, and to establish the dedicated messaging network consequent upon the demand for signalling type data exceeding a predetermined amount. As such the data packets may be communicated via the broadband packet network only until a demand for signalling type packets has reached a predetermined level. In another example the mobile communications devices may provide an indication that they are communicating signalling type messages from one or more application programs and the mobile communications network may establish the dedicated messaging network once a count of the indications has reached a predetermined threshold. This is because when there are few signalling-type applications in the network, it may be inefficient to set up a DMN in order to specifically support these mobile communications devices. This inefficiency could arise because the fixed resource that is set aside for the DMN may be under-utilised by the signalling-type messages. When there is a greater amount of signalling-type traffic, the advantages of having a DMN, which is configured to support signalling-type traffic, may outweigh the disadvantages associated with the inflexibility of partitioning the resource between a DMN and a broadband packet network. In this case it may be better to support these applications on the DMN.

The term "signalling" may refer to application level signalling or network signalling. Examples of application level signalling include polling messages from email applications, presence messages from instant messaging applications, short updates related to games traffic etc. Examples of network signalling include radio resource connection (RRC) signalling and Non-Access Stratum (NAS) signalling. Some traffic, such as short message service (SMS) transmissions, have a high proportion of network signalling relative to user data and may hence be considered to be signalling type traffic.

Further aspects and features of the present invention are defined in the appended claims and include an infra-structure element, a base station, a mobile communications device and methods.

BRIEF DESCRIPTION OF THE DRAWINGS

Example embodiments of the present invention will now be described with reference to the accompanying drawings in which like parts have the same designated references and in which.

DESCRIPTION OF EXAMPLE EMBODIMENTS

Figure 1:
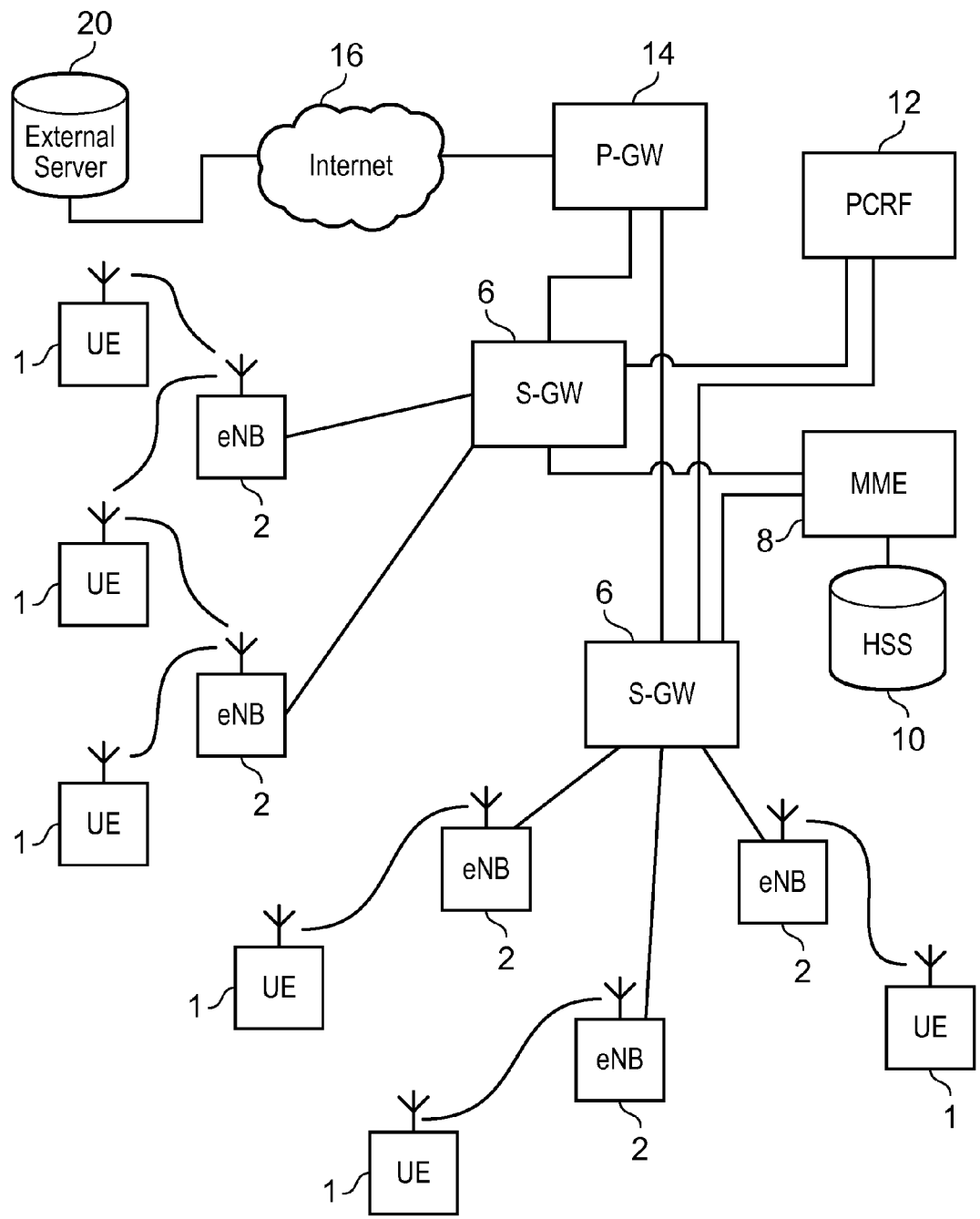
FIG. 1 is a schematic block diagram of a mobile communications network according to the LTE standard.

Embodiments of the present invention will now be described with reference to an implementation which uses a mobile communications network operating in accordance with the 3GPP Long Term Evolution (LTE) standard. FIG. 1 provides an example architecture of an LTE network. As shown in FIG. 1 and as with a conventional mobile communications network, mobile communications devices (also called UEs or terminals) 1 are arranged to communicate data to and from base stations 2 which are referred to in LTE as enhanced NodeBs (eNodeB), for transmitting and receiving data via the wireless or radio access interface with the communications devices 1.

The base stations or eNodeB's 2 are connected to a serving gateway S-GW 6 which is arranged to perform routing and management of mobile communications services to the communications devices 1 as they roam throughout the mobile communications network. In order to maintain mobility management and connectivity, a mobility management entity (MME) 8 manages the enhanced packet service (EPS) connections with the communications devices 1 using subscriber information stored in a home subscriber server (HSS) 10. Other core network components include the policy charging and resource function (PCRF) 12 a PDN (Packet Data Network) gateway (P-GW) 14 which connects to an internet network 16 and finally to an external server 20. More information may be gathered for the LTE architecture from the book entitled "*LTE for UMTS OFDM and SC-FDMA based radio access*", Holma H. and Toskala A. page 25 ff.

In the following description LTE/SAE terminology and names are used. However embodiments of the present technique can be applied to other mobile communications systems such as UMTS and GERAN with the GSM/GPRS core network.

Figure 2:
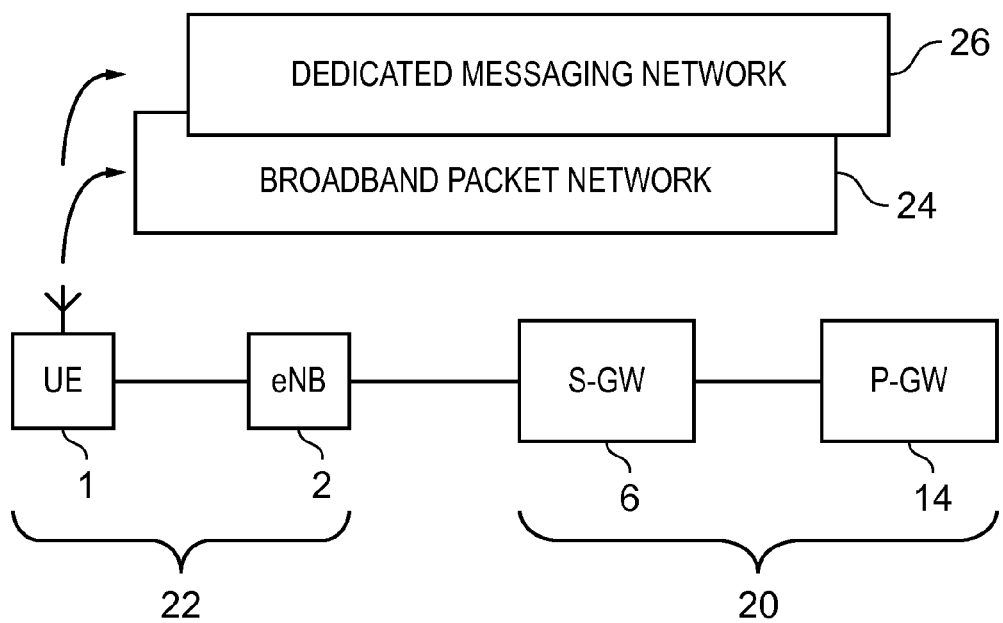
FIG. 2 is a schematic block diagram of part of the mobile radio network shown in FIG. 1 illustrating the operation of a broadband packet network contemporaneously with a dedicated messaging network.

FIG. 2 provides a diagram showing selected components of the mobile communications network shown in FIG. 1 to illustrate the formation of a dedicated messaging network and a broadband network from the same mobile communications network as illustrated in FIG. 1. In FIG. 2 a communication chain is shown from a mobile communications device 1 through an eNodeB 2, a serving gateway 6 and the PDN gateway 14 as they are shown in FIG. 1. In FIG. 2 the serving gateway and PDN gateway 6, 14 form a core network part of the mobile radio network 20 whereas the eNodeB 2 forms a radio network part 22.

In accordance with the present technique the mobile communications network shown in FIGS. 1 and 2 is arranged to provide a broadband packet network and a dedicated messaging network which exists alongside and contemporaneously with the broadband packet network. Thus in accordance with the present technique the broadband packet network may utilise the entire bandwidth of the radio access interface provided by the radio network part and the protocols of the core network part but in parallel a dedicated messaging network 26 may be established. The dedicated messaging network 25 may use only a part of the bandwidth of the radio network part and some reduced functionality or adapted treatment by the core network part 20. This is because the dedicated messaging network is optimised for the communication of small amounts of data which are typical of signalling type applications. As explained above the present technique utilises a dedicated messaging network for communicating signalling type data which is generated by, for example, application programs. The dedicated messaging network is therefore optimised for the communication of short messages such as those associated with signalling data.

In one example the dedicated messaging network (DMN) may be created from a virtual carrier that is a carrier which exists within the complete bandwidth provided by the radio network part of a mobile communications network. Thus in one example the dedicated messaging network may be formed using the techniques disclosed in our co-pending UK patent applications numbers: 1101970.0, 1101981.7, 1101966.8, 1101983.3, 1101853.8, 1101982.5, 1101980.9 and 1101972.6, the contents of which are incorporated herein by reference. A brief summary of this example of a dedicated messaging network is provided below. However a DMN can characterized as being adapted to communicating small messages or data-grams, which can make more efficient use of hardware and communications resources compared with the broadband packet network, and can support a larger amount of control signalling. For example, the DMN may support more PDCCHs per sub-frame (possibly by a reduction in the size of the PDCCH). The DMN may be configured to support a greater amount of RACH resource (which may be useful for machines that are not permanently connected to the DMN, but communicate in a connectionless manner). The broadband packet network is characterized as being optimized for the transmission of large messages at high speed. The broadband packet network could be an HSPA or (preferably) an LTE network. These networks may have a restricted amount of available signalling resource in comparison to the amount of user-data resource (hence these networks may be overloaded by the application signalling messages from smart-phone applications: it is possible that substantially all of the control portion of the broadband packet network is used before the user-data portion is completely assigned).

Figure 3:
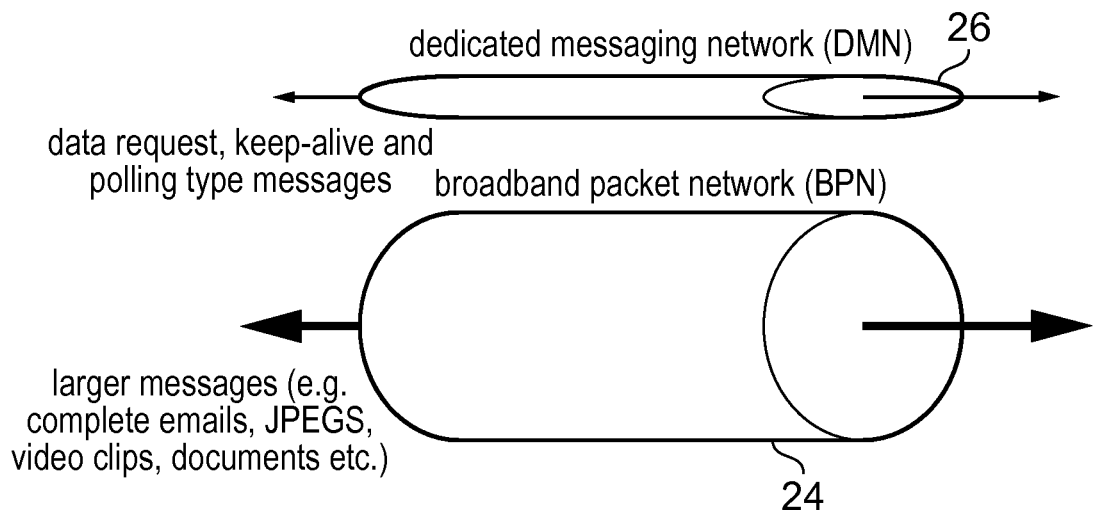
FIG. 3 is a schematic block diagram showing a dedicated messaging network operating contemporaneously with a broadband packet network.

In accordance with the present technique therefore, the dedicated messaging network 26 may be arranged to communicate data request, keep-alive and polling type messages as shown in FIG. 3. In contrast the broadband packet network 24 may be used to communicate larger messages such as complete emails, Jpegs, video clips, etc. The generation of different types of packet data may be by different applications, and so in one example, the dedicated messaging network and the broadband packet network may serve different applications where one of the applications communicates with small signalling type messages that are routed through the dedicated messaging network (for example a stock update application) and another application communicates with larger packet sizes through the broadband network (for example a video download application).

As explained above, smart-phones and portable computers for example transmit many application level signalling messages, including data request, keep-alive and polling type messages on a mobile communications network. These signalling-type messages are related to certain machine-like applications that are running on the mobile communications device. Example machine-like applications are:

An email client regularly polls the email server to check for updates and the email server may page the email client to inform it of pending email messages at the server. These signalling page and poll messages are typically short (maybe several hundred bits).

A social networking application polls an internet server and may be "paged" by an internet server to indicate that there is an update to the user's social network that could be downloaded.

Cloud-based productivity applications may send updates to a server in the cloud indicating whether there has been an update to a document on the mobile communications device. If there is an update, that update could be transmitted to or from the mobile communications device.

Figure 4:
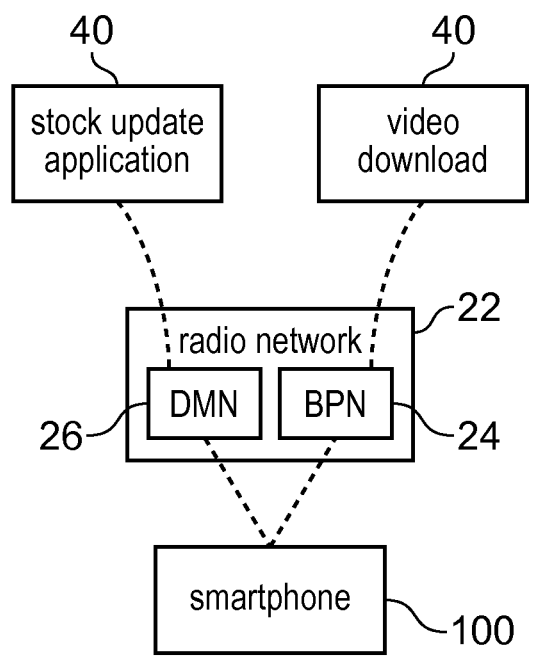
FIG. 4 is example of an operation of a mobile communications device such as a smart phone communicating data packets of different types via the dedicated messaging network and the broadband packet network.

In one example application a smart phone may be executing different applications programs which may require the communication of different types of data including user data which may require broadband communication, for example, video downloads etc. and signalling type data which may be spontaneous and sporadic in its requirement and require a small bandwidth. Thus in accordance with the present technique as shown in FIG. 4, a mobile communications device 100, which may be a smart phone may communicate signalling type data via the dedicated messaging network 26 and user data via the broadband packet network 24 of the radio network part 22. The data packets are communicated to different application servers 40, 42 although in other examples they may in fact be the same server, the packets being directed to the same destination but being of different types. To achieve the discrimination for communicating data packets via either the dedicated messaging network 26 or the broadband packet network 24, the smart phone 100 is provided with a discrimination function which is shown in FIGS. 5 and 6.

Figure 5:
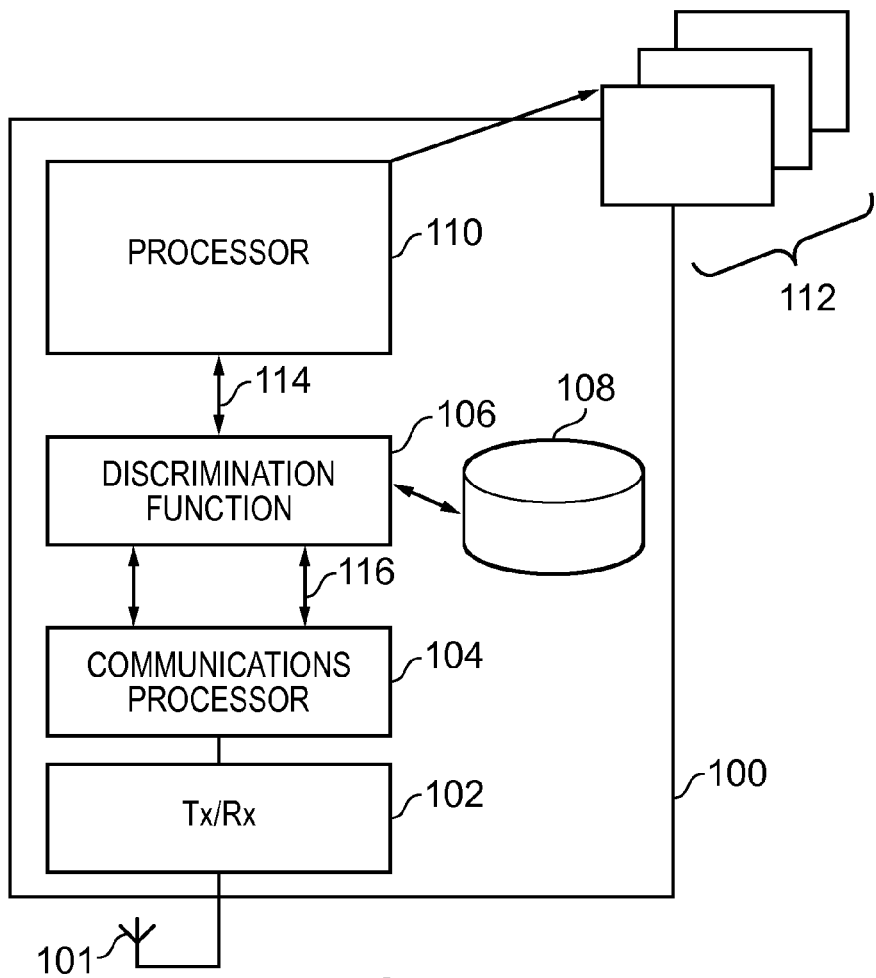
FIG. 5 is a schematic block diagram of a mobile communications device configured in accordance with the present technique to include a discrimination function.
Figure 6:
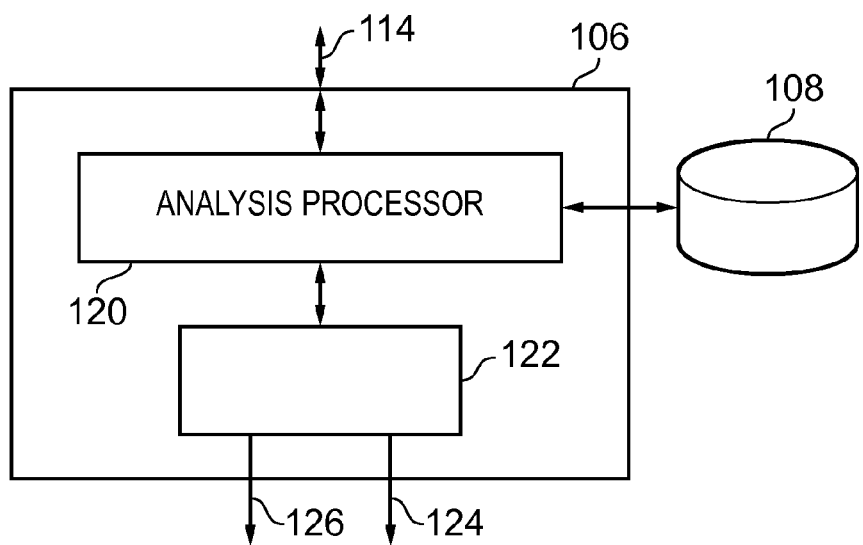
FIG. 6 is a more detailed example block diagram of the discrimination function which appears in the schematic block diagram of the mobile communications device shown in FIG. 5.

In FIG. 5 the mobile communications device 100 which is shown in FIG. 4 is shown in more detail. As with a conventional mobile communications device, the mobile communications device 100 includes a transmitter and receiver unit 102 for communicating via a wireless access interface provided by the radio network part of the mobile communications part of the network. An antenna 101 is used to both transmit and receive signals via the radio access interface. A communications processor 104 controls the communication of data via the transmitter and receiver unit 102. The communications processor 104 establishes different radio access bearers in accordance with the type of communication which is required. The different radio access bearers according to the present technique are via the dedicated messaging network and the broadband packet network respectively. Packets for communication via the dedicated messaging network and the broadband packet network are respectively identified by a discrimination function 106 in combination with, where appropriate, a data store 108.

A processor 110 operates on the mobile communications device to execute applications programs 112 which provides functions to the user. The application programs 112 may be of different sorts and have different requirements. It is according to the different requirements that packets are communicated via the different networks. Thus whilst the processor is executing the application programs which then generate data to be communicated, for example in accordance with an internet protocol, the discrimination function then analyses the data packets and determines whether the data packets are better communicated via the dedicated messaging network or the broadband network. Accordingly an interface 114 between the processor 110 and the discrimination function 106 provides the protocol data packets to be communicated by the communications processor to the discrimination function 106.

In some examples an Application Programming Interface (API) operating on the processor 110 may provide additional information indicating that the data packet is for signalling as explained below. Having received the data packets and any additional information which provides a discrimination function with an indication that the data packet is for signalling, the discrimination function may direct the data packets via one of the interfaces 116 to the communications processor 104 so that the communications processor is provided with an indication that the data packet is to be communicated via the dedicated messaging network instead of the broadband packet network. Conversely the discrimination function may also be provided with an indication by the API that a data packet is for communication via the broadband packet network and accordingly the communications processor receives on the interface 116 from the discrimination function 106 a direction that the data packet is to be communicated via the broadband packet network.

Various other techniques are proposed for discriminating between data packets which are to be communicated via the dedicated messaging network and data packets which are to be communicated by the broadband packet network. These techniques will be explained in the following paragraphs. A more detailed example of the discrimination function 106 is shown in FIG. 6. In FIG. 6 the discrimination function 106 is shown to include an analysis processor 120 which receives the data packets from the interface 114 from the processor 110. The analysis processor parses the data packets in accordance with information extracted from the packets and compares this information with predetermined information stored in the data store 108. For example as explained below the information could include domain name, application type, port socket number or protocol type. Based on the information the analysis processor then routes the data packet to a switch 122 which routes the data packets via either a first output for communication via the dedicated messaging network 124 or a second output 126 for communication via the broadband packet network.

In another example the analysis processor receives the data packets from a particular application as identified by either a destination or a source address and analyses the nature of the communication requirements of the packets. For example, the packets for a given destination from a given source are analysed within a predetermined period of time and a number of packets for communication determined. If a small number of data packets are required to be communicated to a particular source from a particular destination the analysis processor may conclude that the data packets are to be communicated via the dedicated messaging network. Accordingly the analysis processor routes the data packets to the first output 124. In contrast if the number of data packets is relatively large within a predetermined period of time then routing via the broadband packet network is more appropriate and so the analysis processor uses the switch 122 to route the data packets via the second output 126.

Techniques for Discrimination

As explained above the discrimination function is configured to discriminate between data packets from applications as either being of signalling-type or being of broadband-type. The following list describes some example methods by which this discrimination could be made:

Protocol type: For example if packets from an application are transported according to an RFC of a particular protocol, they can be classified as being of signalling-type. Example protocols are the SIMPLE protocol (SIP=Session Initiation Protocol, SIMPLE=SIP for Instant Messaging and Presence Leveraging Extensions) and the Open Mobile Alliance's Instant Messaging and Presence Service. The communications system may map all messages of a particular protocol type as being of signalling-type.

Application: The communications system has an API (application programming interface) that allows applications to communicate over the system. The API may have a parameter that allows the application to define whether it produces signalling-type or broadband-type messages.

Domain name: Messages that are transmitted to some domain names are likely to contain signalling-type messages. For example messages that are sent to and from twitter.com are likely to be small signalling-type messages of a length of 140 characters or less whereas data that is sent from bbc.co.uk is likely to consist of web pages, audio or video content that is of broadband-type.

The socket or port number of the generated messages. Many port numbers relate to specific applications. For example internet port number 5190 corresponds to AOL Instant Messenger and port number 21 corresponds to FTP. In this example, any messages on port number 5190 could be classified as signalling-type and any messages using port number 21 could be classified as broadband-type: based on knowledge of the traffic type, the UE could determine whether signalling-type or broadband-type applications are active. Any application that requests the opening of port number 5190 could be classified as a signalling-type application (and conversely for an application that opens port number 21). Example port numbers for applications are listed at the following URL:
http://kb.netgear.com/app/answers/detail/a_id/1166/~/port-numbers-for-port-forwarding As mentioned above, the characteristics of the traffic from the device can be measured and the traffic can thence be classified as either being of signalling-type or of broadband-type. Suitable characteristics of the traffic that could be measured are:
size of data packets
frequency of occurrence of data packets
variance (statistical) of the inter-arrival times of packets Packets that are small, infrequent and that appear to occur at quasi-random times could be considered to belong to signalling-type applications.

Location of Discrimination Function

The decision as to whether the application is a signalling-type or a broadband-type application is advantageously made at the mobile communications device. The mobile communications device is a self-contained device having access to both the application and the communications system. In contrast the network (e.g. E-UTRAN) forms the communications system and this communications system is more loosely connected to the application, where the application may for instance be located on an application server. If the decision point were made in the network, there may need to be signalling between the application server (e.g. based in the internet) and the communications system: this signalling may be cumbersome to implement.

When the decision between signalling-type and broadband-type communications is made in the mobile communications device, the mobile communications device may either explicitly send an indication of "signalling-type"/ "broadband-type" to the network or may simply select/ request a radio bearer with the appropriate QoS parameters. In either case the communications system can determine whether the mobile communications device is going to generate signalling-type or broadband-type traffic and set up/release DMN resources as appropriate (based either on reception of specific "signalling-type"/"broadband-type" indications or based on the type of radio bearer).

Figure 7:
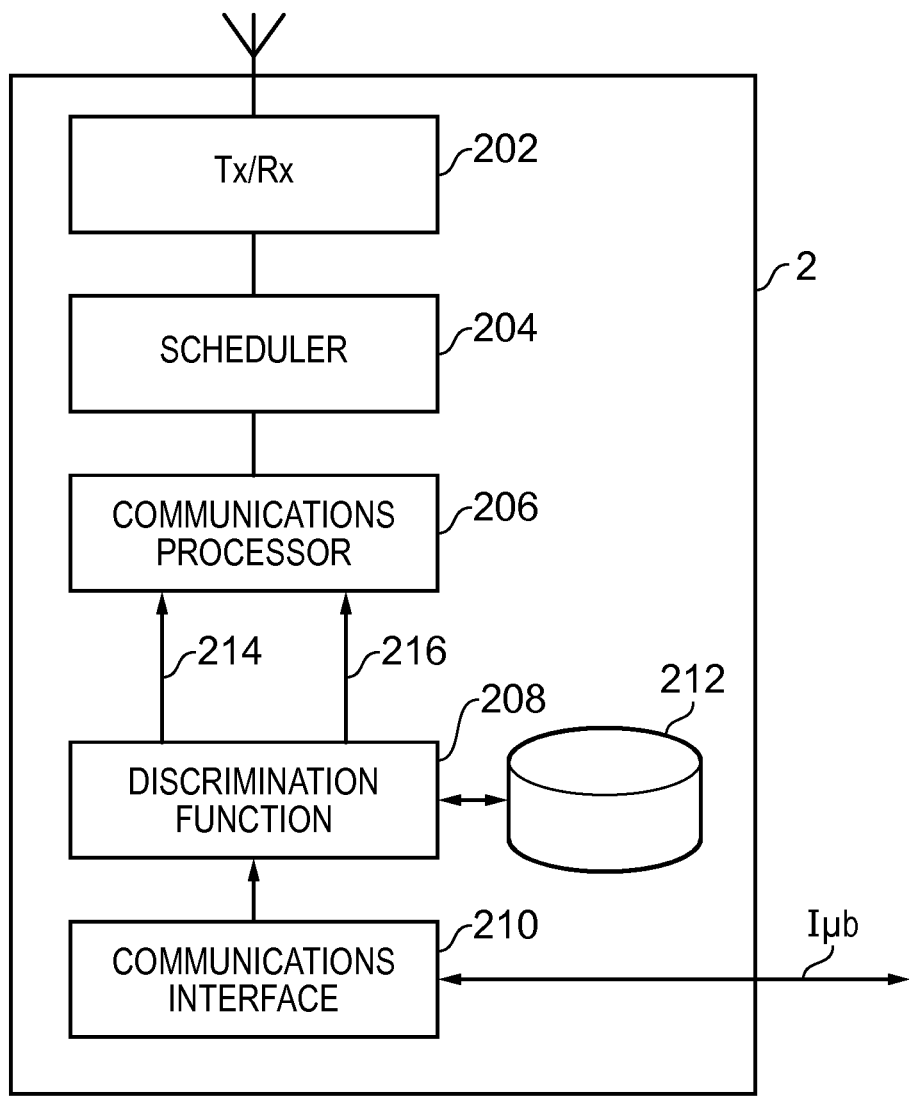
FIG. 7 is a schematic block diagram of a base station operating within the mobile communications network in accordance with the present technique.

In a further example the discrimination function may be performed within another infrastructure equipment of the mobile communications network such as for example in the eNodeB. FIG. 7 provides an example illustration of the further example of the present technique. In FIG. 7 the eNodeB 2 is shown to comprise a transmitter receiver unit 202, a scheduler 204, a communication processor 206 as well as a discrimination function 208 and a communications interface 210. A communications interface 210 forms an interface to the serving gateway 6. Thus the communications interface 210 receives data packets from the serving gateway 6 and sends data packets to the serving gateway 6 in accordance with the conventional operation of an LTE network. As for the example of the mobile communications device, the eNodeB 2 operates with a transceiver unit 202, and furthermore includes a scheduler a 204 and a communications processor 206, which operate with the transceiver unit 202 in a conventional way to form a radio access interface. However, as explained above the eNodeB 2 is arranged to provide in parallel a dedicated messaging network and a broadband packet network. Correspondingly therefore, the discrimination function 208 is arranged to operate with a data store 212 to communicate data packets to mobile communications devices using either the broadband packet network or the dedicated messaging network in accordance with the predetermined criteria for example those indicated above. Therefore correspondingly the data store 212 includes a store of a correspondence between for example a domain name, a socket or port number, protocol type or application type and whether data packets that are communicated in accordance with those criteria are signalling data packets or user data packets. Therefore in accordance with the present technique the discrimination function routes the data packets to the communications processor 206 via either a first output 214 or a second output 216 for communicating respectively the data packets via the dedicated messaging network and the broadband packet network.

Establishing the Dedicated Messaging Network

When there are few signalling-type applications in the network, it may be inefficient to set up a dedicated messaging network in order to specifically support these mobile communications devices. This inefficiency could arise because the fixed resource that is set aside for the dedicated messaging network may be under-utilised by the signalling-type messages. When there is a greater amount of signalling-type traffic, the advantages of having a DMN (that is well suited to the support of this signalling-type traffic) may outweigh the disadvantages associated with the inflexibility of partitioning the resource between a DMN and a BPN. In this case it may be better to support these applications on the DMN.

According to some examples of the present technique the mobile communications network may decide whether to instantiate a DMN (e.g. a virtual carrier within a host carrier) based on a count of the number of signalling-type applications that are active in the cell. The network can determine the number of signalling-type applications either based on knowledge of traffic at the network or based on a count that is signalled from terminals to the network.

When the network determines the number of signalling-type applications, there are various possibilities for counting the number of such applications:
the eNodeB performs packet inspection (where the eNodeB parses the packet to determine the nature of the data within the transmission) on packets in order to determine the type of packet: signalling or data bearing.
the core network performs packet inspection. This method may be advantageous since the packets may be ciphered at the lower layers (that the eNodeB deals with)—this makes it difficult to perform packet inspection at the eNodeB. The core network would then inform the eNode B of the need to instantiate a DMN.
Machine Type Communication (MTC) application servers indicate to the core network the nature of the traffic that its connected terminals will generate (e.g. an MTC application server may indicate to the network that a terminal is generating traffic from an instant messaging application (signalling type) and another terminal is generating traffic from a photo upload application (data bearing type)).

When the terminal determines the number of signalling-type applications, it may make this determination based on:
packet inspection at the telecommunications protocol stack level, or
indications from applications running on the terminal regarding the type of traffic (signalling-type or data bearing type) that they are generating.

The mobile device may then indicate the type of traffic to the network via network signalling (either RRC signalling or NAS signalling). The traffic type may be signalled as part of the RRC connection setup procedure as explained below with reference to FIG. 8 and/or may be updated when new applications become active as illustrated below with reference to FIG. 9 (where one of the early transmissions from an application may include information relating to the traffic type, possibly in a separate part of the message).

Figure 8:
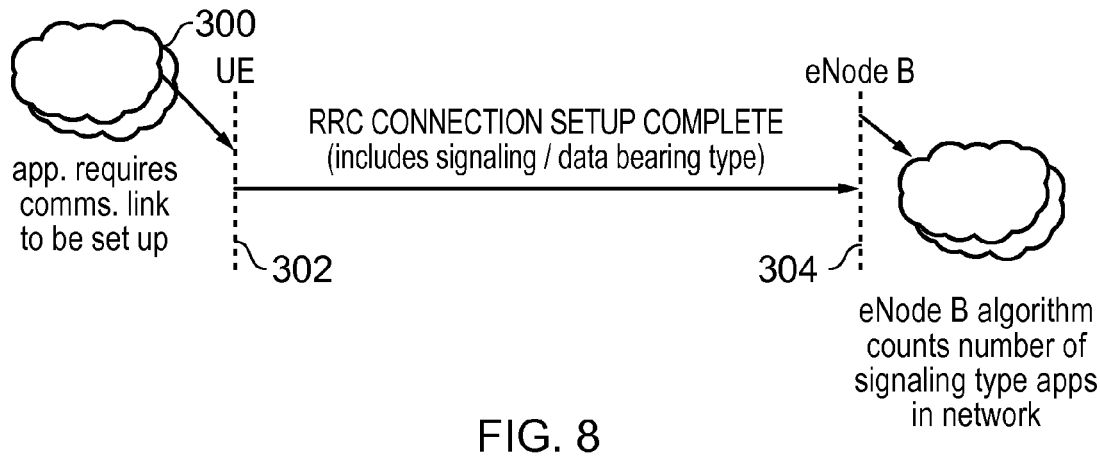
FIG. 8 is a part signalling diagram illustrating an example process of establishing a dedicated messaging network.

In FIG. 8 an application 300 for providing a communications service to a user within a mobile communications device communicates a radio resource connection (RRC) set up complete message which includes signalling a data bearer type. Correspondingly, the eNodeB 304 counts the number of signalling type applications in the network. The count of signalling type application in a network is determined within the discrimination function 208 and compared with a threshold stored in a data store 212. If the number of counts of the signalling type applications exceeds a certain predetermined threshold then at this point the eNodeB is provided with an indication that there is sufficient traffic for it to be worthwhile to establish the dedicated messaging network. Accordingly the dedicated messages network is established.

Figure 9:
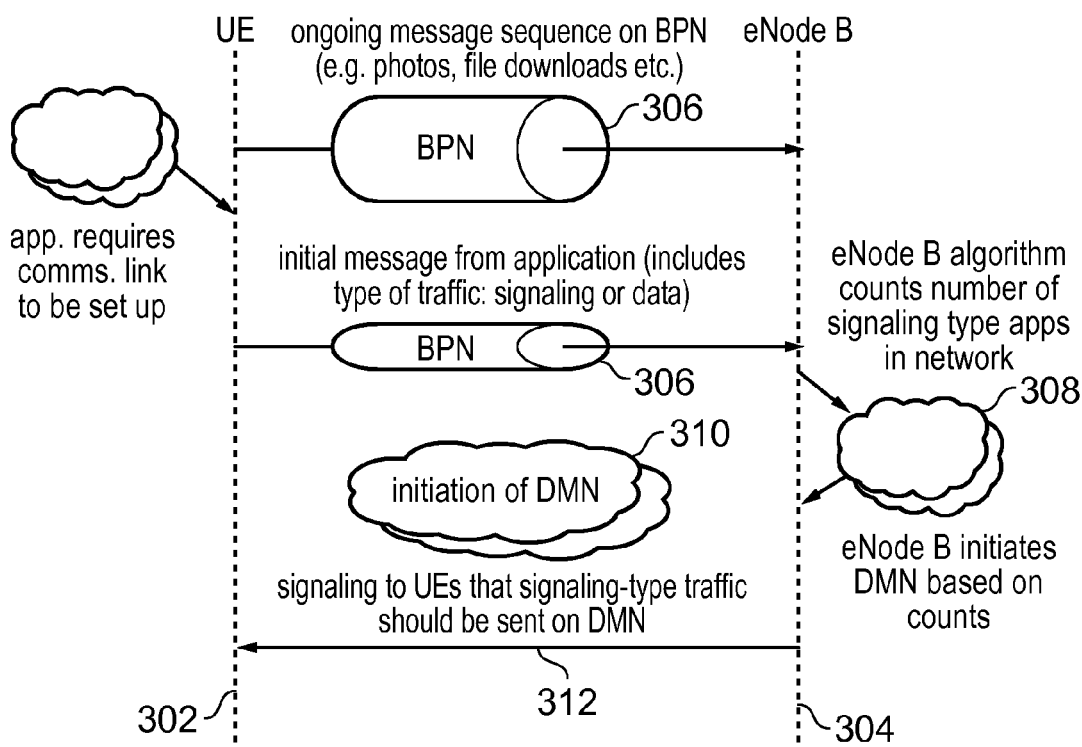
FIG. 9 is a part schematic signalling diagram illustrating a process for establishing a dedicated messaging network whilst applications programs are currently being communicated via a broadband packet network.

A further illustration of the initiation of a dedicated messaging network is shown in FIG. 9. In FIG. 9 an alternative arrangement is illustrated for establishing the dedicated messaging network. In FIG. 9 a mobile communications device 302 is currently communicating all types of data using the broadband packet network to the eNodeB 304. Thus the broadband packet network (BPN) 306 communicates photos, file downloads as well as other types of communications. At a further point in time the broadband packet network 306 is also communicating messages from applications which include an indication of the traffic type for example signalling or data. The eNodeB 304 then at a process point 308 counts the number of signalling type applications in the network. If the number of signalling type applications in the network exceeds a predetermined number then the discrimination function 208 initiates the dedicated messaging network at a process point 310. The eNodeB 304 then signals to the mobile communications devices that signalling type traffic should be sent on the dedicated messaging network via a message 312.

The network may count the number of signalling-type applications in the network, which may be different to the number of mobile communications devices which are active in the network (for example one mobile communications device may contain a plurality of active signalling-type applications, e.g. stock updates, instant messaging, social networking etc. applications) and compare this number of applications to a threshold. If the number of signalling type applications is greater than a threshold, the network may then instantiate a DMN.

Note that if there are low capability MTC-type mobile devices in the network, the eNodeB may have already initiated a DMN. The network algorithm may then be applied to determine whether:
the sum of the number of low capability MTC devices and the signalling type smart phone applications is sufficiently great to instantiate a second DMN within the host carrier; and/or
it is desirable to offload the signalling-type smart-phone applications onto the DMN.

An application that generates short message service (SMS) type messages may be identified as an application that should be advantageously mapped to a dedicated messaging network. The data bearing messages of such an application are short. The network signalling associated with SMS message transfers may also be advantageously supported on the DMN.

Figure 10:
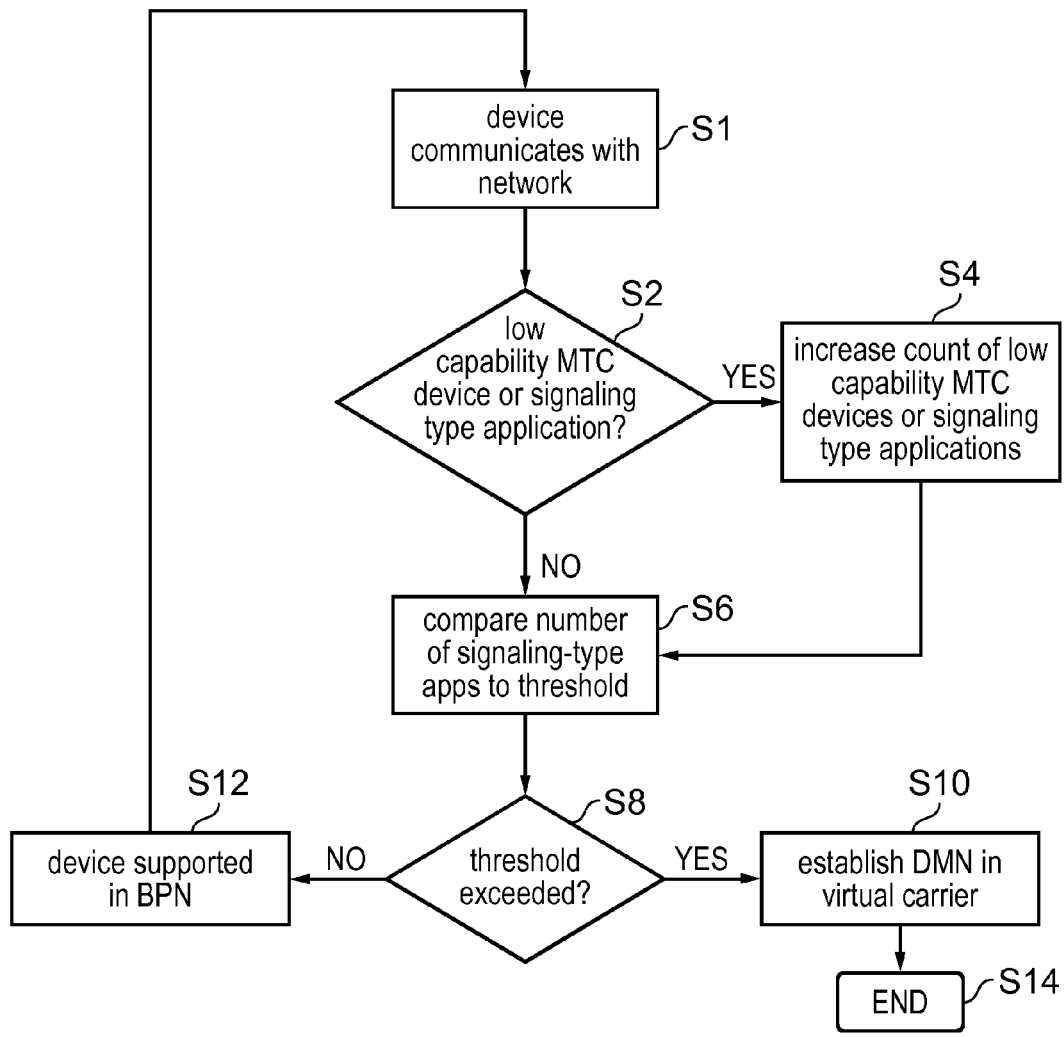
FIG. 10 is a flow diagram illustrating a process performed by a discrimination function within a network element to determine whether or not a dedicated messaging network should be established.

An example diagram illustrating the operation of the discrimination function within the eNodeB is provided in FIG. 10. The operation of the discrimination function as represented via the flow diagram in FIG. 10 is summarised as follows:

S1: A mobile communications device communicates with the network sending data packets from applications programs or other sources which are executing on the mobile communications device.

S2: The discrimination function within the network entity determines whether the device communicating the data packets is a low capability MTC device, that is a machine type communications device. Alternatively the data packets may be analysed to determine whether they contain signalling type data (as explained above) in order to classify applications as either being of signalling-type or data-bearing type. If the device communicating the data packet is an MTC device or the data packet was communicated by a signalling type application then processing proceeds to step S4. Otherwise processing proceeds to step S1.

S4: If the data packet was communicated via an MTC mobile communications device or the data packet was communicated by a signalling type application then the respective count for mobile communications devices communicating signalling or the count of applications of signalling type is incremented so that either one or both of these counts increases.

S6: The number of the counted mobile communications device that are communicating signalling data or the number data signalling packets being communicated is then compared to a threshold. The threshold may be stored in an associated data store which the discrimination function has access to.

S8: If the number of mobile communications devices communicating signalling data exceeds the threshold then processing proceeds to step S10. Alternatively if the number of data packets which are of a signalling type exceeds the corresponding threshold then processing also proceeds to step S10. Otherwise processing proceeds to step S12 and all of the communication of data packets is supported by a broadband packet network.

S10: If the threshold is exceeded then the dedicated messaging network is established by the network using for example using a virtual carrier. Processing then ends at S14.

S12: If the threshold is not exceeded then all communications of data packets from all mobile communications devices is supported with a broadband packet network or the mobile communications network operating conventionally.

In an alternative embodiment of the invention, a DMN would be set up either when at least one low capability MTC device exists in the network or when the number of signalling type applications exceeds a threshold. In the embodiment illustrated in FIG. 10, when the number of low complexity MTC devices does not exceed a threshold, those devices may either wait until a DMN is established or may attempt to select a different carrier that does support a DMN.

Further Example of a Dedicated Messaging Network

Figure 11A:
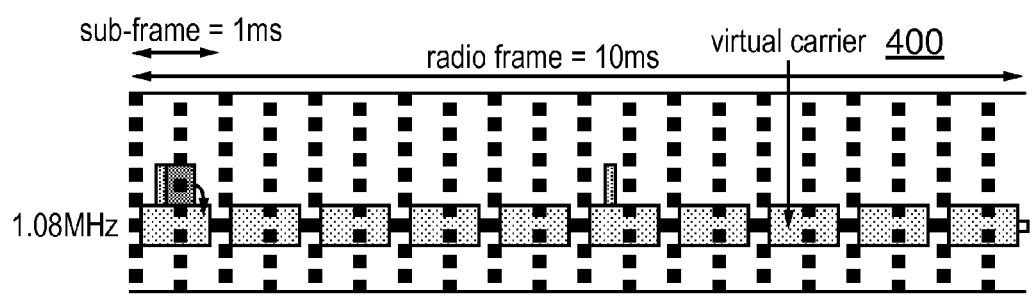
FIG. 11a is a schematic graphical representation illustrating the operation of a virtual carrier which supports a dedicated messaging network within a radio access interface operating in accordance with the LTE standard.
Figure 11B:
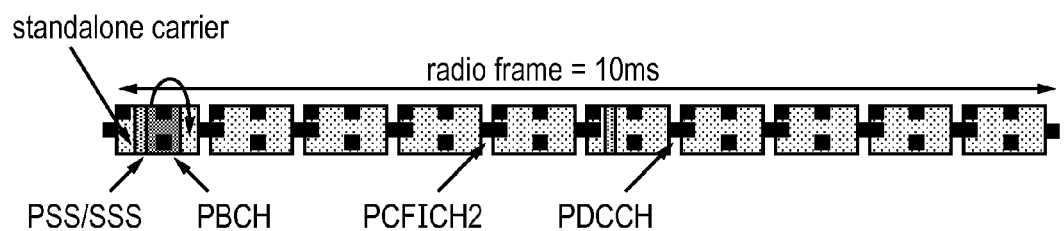
FIG. 11b is a corresponding schematic graphical representation of a stand alone carrier.
Figure 12:
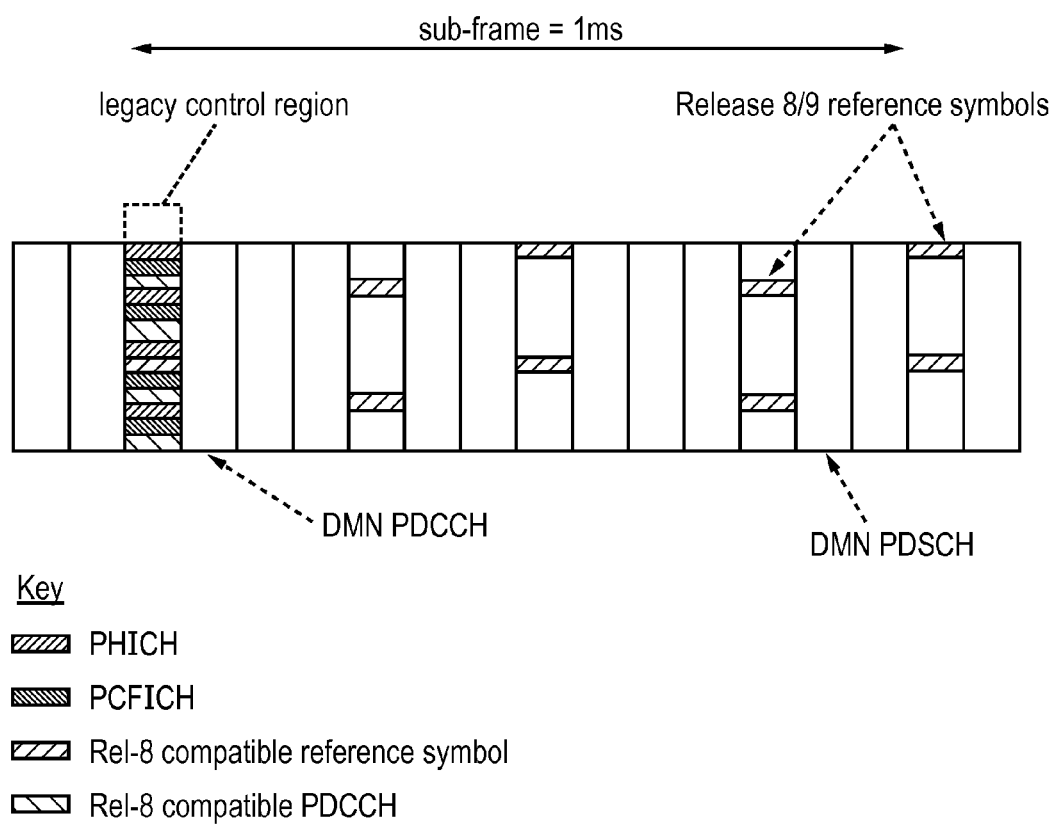
FIG. 12 is a correspondingly more detailed example of channel structure for a dedicated messaging network implemented using a virtual carrier arrangement.

Examples of dedicated messaging network include those created using a virtual carrier which uses some frequency resource within a host carrier in which a DMN can be deployed. A DMN which is dedicated to the support of messaging traffic can be operated either within a virtual carrier or using a standalone carrier. The structure of the DMN can be similar whether it operates as part of a virtual carrier or on a standalone carrier. FIG. 11a shows the operation of a DMN within a virtual carrier where the Physical Broadcast Channel (PBCH) in the host carrier points to the virtual carrier, whereas FIG. 11b shows the operation of a DMN within a standalone carrier, which is almost identical to the virtual carrier case except that a Physical Broadcast Channel PBCH points to the standalone carrier and there is no surrounding host carrier.

A DMN addresses shortcomings of current releases of LTE in respect of the communication of signalling type messages. The dedicated messaging network may be based on LTE technology and address the following aspects:
- A DMN can be adapted to support mobile communications devices which communicate a large amount of signalling type data by improving an efficiency of control channel signalling (PDCCH, PUCCH, PHICH etc.).
- Small messages are efficiently supported on the PDSCH in the DMN.
- The DMN allows mobile devices at the far cell edge to communicate using techniques that are specific to DMN networks.
- A DMN may preferably operate in a half-duplex mode. Operation in a half duplex mode (whether TDD or FDD) removes the need for a set of duplexers. Removal of duplexers can reduce device cost and improve the link budget (when switches either have less loss or a lower noise figure than duplexers).
- The DMN may operate in a distinct frequency range compared to the broadband packet network (BPN). This is true both of the virtual carrier and the standalone carrier cases. In the virtual carrier case, the DMN is confined to (e.g.) 1.4 MHz within the bandwidth of the host carrier. In the standalone carrier case, the DMN occupies a totally distinct set of frequencies to the BPN.
- The DMN may operate with a separate control region to the BPN. There are some cases where the DMN supports both the host control region (for backwards compatibility reasons) and the DMN-control region, for example in the case of the virtual carrier where the virtual carrier assigns some symbols to the host control region and some symbols to the virtual carrier control region.
- The DMN uses different allocation formats (i.e. different PDCCH structures) to those used on the BPN. Example ways in which the allocation messages may be different are:
  - the DMN uses conversation allocation messages as disclosed in co-pending UK patent application number 1016986.0 the contents of which are incorporated herein by reference.
- the DMN and BPN are different communications technologies but use the same reference symbols and sync signals.

Other Example Embodiments

According to the embodiments described above, the mobile communications device can connect to two networks at the same time (where the DMN is typically a virtual carrier within a host BPN). Although in current networks, different traffic types can be sent down different radio bearers (e.g. with different qualities of service), each device only has a single connection to the network (it is not connected with two different types of network). In a current network, the mobile device can have two connections to the same network. For example the device can be connected to the network via a dedicated channel (e.g. a DCH for the support of voice traffic) and via a shared channel (e.g. an HSPA channel for the support of packet-switched services). However these two connections are via the same underlying communications technology (WCDMA is the underlying communications technology in the DCH & HSPA case). In contrast embodiments of the present technique have two connections, each via a different network (even though one of the networks may be a virtual carrier within the spectrum of another carrier). The DMN is considered to be a different network to the BPN because:
- the resource space occupied by the DMN is distinct from that occupied by the BPN (the DMN occupies some OFDM/SC-FDMA sub-carriers during some OFDM/SC-FDMA symbols only); and
- the DMN control signalling (for resource allocations, ACK/NACK and CQI signalling) is separate to that of the BPN. This control signalling can be decoded without the need to decode the BPN; and
- a device only needs a receiver and transmitter with the bandwidth of the DMN in order to be able to communicate on the DMN (this distinguishes a DMN from some other channel such as an HSPA channel which requires a device operating at the host carrier bandwidth to decode it).

Various modifications may be made to the embodiments of the invention hereinbefore described with reference to the drawings without departing from the scope of the present invention as expressed in the appended claims. Other examples are envisaged within the scope of the appended claims, such as where the host mobile communications network operates in accordance with a standard other than LTE. As will be appreciated a location of a device which is responsible for establishing the dedicated messaging network or the functions which determine whether each data packet should be communicated may be located at any convenient point within the network.

The invention claimed is:
1. A mobile communications system, comprising:
a mobile communications device; and
a mobile communications network configured to communicate data packets to and/or from the mobile communications device, the mobile communications network including:
a radio network part including one or more base stations for communicating the data packets to and/or receiving the data packets from the mobile communications device via a radio access interface; and a core network part including infrastructure equipment for communicating the data packets to and/or receiving the data packets from the one or more base stations, wherein the core network part and the radio network part are configured to provide a broadband packet network (BPN), via the one or more base stations, configured to communicate the data packets to and/or receive the data packets from the mobile communications device in accordance with a relatively high bandwidth, and contemporaneously provide a dedicated messaging network (DMN) in a virtual carrier via the one or more base stations, the DMN configured to communicate the data packets to and/or receive the data packets from the mobile communications device in accordance with a relatively low bandwidth, at least one of the one or more base stations or the infrastructure equipment is configured to determine a number of mobile communication devices which are communicating data packets for signalling type applications, and initiate provision of the DMN based on a comparison of the number of mobile communications devices to a predetermined threshold, and at least one of the mobile communications device, the one or more base stations or the infrastructure equipment is configured to determine, based on predetermined criteria, whether to communicate each of the data packets via either the BPN or the DMN.

2. The communications system as claimed in claim 1, wherein at least one of the mobile communications device, the one or more base stations or the infrastructure equipment is configured to parse the data packets for communication to determine, based on the predetermined data, whether the data packet is for signalling data or user data, communicate the data packet via the DMN when the data packet is for signalling data, and communicate the data packet via the BPN when the data packet is for user data.

3. The communications system as claimed in claim 2, wherein the predetermined criteria includes one or more of a protocol type, an application type, a domain name, a socket or port number of the data packets.

4. The communications system as claimed in claim 3, wherein the mobile communications device includes a processor configured to:

provide an application programmer's interface (API) providing an interface between application programs executed on the processor, provide a discrimination function configured to receive from the API an indication of the application type of each of the application programs, and determine whether the data packets are for communication via the DMN or the BPN based on the application type.

5. The communications system as claimed in claim 4, wherein at least one of the mobile communications device, the one or more base stations or the infrastructure equipment includes a discrimination function and a data store, and the discrimination function is configured to determine whether the data packets are for communication via the DMN or the BPN by comparing a domain name of the data packets with one or more predetermined domain names pre-stored in the data store with an indication of whether the domain name is associated with signalling data or user data.

6. The communications system as claimed in claim 4, wherein at least one of the mobile communications device, the one or more base stations or the infrastructure equipment includes a discrimination function and a data store, and the discrimination function is configured to determine whether the data packets are for communication via the DMN or the BPN by comparing a socket or port number of the data packets with one or more predetermined socket or port numbers pre-stored in the data store with an indication of whether the domain name is associated with signalling data or user data.

7. The communication system as claimed in claim 1, wherein one of the one or more base stations or the infrastructure equipment is configured to monitor an amount of demand for signalling type data, and establish the DMN consequent upon the demand for signalling type data exceeding a predetermined amount.

8. The communications system as claimed in claim 7, wherein the at least one of the one or more base stations or the infrastructure equipment is configured to count at least one of the number of applications programs communicating the data packets for signalling data, and initiate the provision of the DMN based on a comparison of the number of signalling applications programs to a corresponding predetermined threshold.

9. The communications system as claimed in claim 1, wherein the DMN is formed from a reduced bandwidth version of a bandwidth of the radio network part, and the BPN is formed from a larger portion of the radio network part.

10. A mobile communications device for communicating data packets to and/or from a mobile communications network, the mobile communications network comprising a radio network part including one or more base stations for communicating the data packets to and/or receiving the data packets from the mobile communications devices via a radio access interface, and a core network part including infrastructure equipment for communicating the data packets to and/or receiving the data packets from the one or more base stations of the radio network part, the mobile communications device comprising:

circuitry configured to determine, based on predetermined criteria, whether to communicate the data packets via either a broadband packet network (BPN) or a dedicated messaging network (DMN), wherein at least one of the one or more base stations or the infrastructure equipment is configured to determine a number of mobile communication devices which are communicating data packets for signalling type applications, and initiate provision of the DMN based on a comparison of the number of mobile communications devices to a predetermined threshold, the BPN communicates the data packets in accordance with a relatively high bandwidth and is provided by the one or more base stations of the mobile communications network, and the DMN communicates the data packets in accordance with a relatively low bandwidth and is contemporaneously provided by the one or more base stations of the mobile communications network in a virtual carrier.

11. The mobile communications device as claimed in claim 10, wherein the circuitry is configured to
parse the data packets for communication to the mobile communications network to determine, based on the predetermined criteria, whether the data packet includes signalling data or user data,
communicate the data packet via the DMN when the data packet is for signalling data, and
communicate the data packet via the BPN when the data packet is for user data.

12. The mobile communications device as claimed in claim 11, wherein the predetermined criteria includes one or more of a protocol type, an application type, a domain name, a socket or port number of the data packets.

13. The mobile communications device as claimed in claim 12, wherein the circuitry is configured to:
provide an application programmer's interface (API) providing an interface between application programs,
provide a discrimination function configured to receive from the API an indication of the application type of each of the application programs, and
determine whether the data packets are for communication via the DMN or the BPN based on the application type.

14. The mobile communications device as claimed in claim 12, wherein the circuitry is configured to provide a discrimination function configured to determine whether the data packets are for communication via the DMN or the BPN by comparing a domain name of the data packets with one or more predetermined domain names pre-stored in a data store with an indication of whether the domain name is associated with signalling data or user data.

15. The mobile communications device as claimed in claim 12, the circuitry is configured to provide a discrimination function configured to determine whether the data packets are for communication via the DMN or the BPN by comparing a socket or port number of the data packets with one or more predetermined socket or port numbers pre-stored in a data store with an indication of whether the domain name is associated with signalling data or user data.

16. The mobile communications device as claimed in claim 11, wherein the circuitry is configured to communicate an indication to the mobile communications network that one or more of the data packets are for signalling data.

17. The mobile communications device as claimed in claim 16, wherein the circuitry is configured to count the number of applications programs for communicating the data packets for signalling data, and to communicate the indication based upon the number of applications programs communicating data packets for signalling data.

18. The mobile communications device as claimed in claim 10, wherein the DMN is formed from a reduced bandwidth version of a bandwidth of the radio network part, and the BPN is formed from a larger portion of the radio network part.

19. A base station in a mobile communications network, the base station for communicating data packets to and/or receiving the data packets from mobile communications devices via a radio access interface, and the mobile communications network including a core network part comprising infrastructure equipment for communicating the data packets to and/or receiving the data packets from the base station, the base station comprising:
circuitry configured to
determine, based on predetermined criteria, whether to communicate the data packets to the mobile communication devices via either a broadband packet network (BPN) or a dedicated messaging network (DMN);
provide the BPN, the BPN communicating the data packets in accordance with a relatively high bandwidth;
determine a number of the mobile communication devices which are communicating data packets for signalling type applications; and
contemporaneously provide the DMN in a virtual carrier based on a comparison of the number of the mobile communications devices to a predetermined threshold, the DMN communicating the data packets in accordance with a relatively low bandwidth.

20. The base station as claimed in claim 19, wherein the circuitry is configured to
parse the data packets for communication to determine, based on the predetermined criteria, whether the data packet includes signalling data or user data,
communicate the data packet via the DMN when the data packet is for signalling data, and
communicate the data packet via the BPN when the data packet is for user data.

21. The base station as claimed in claim 20, wherein the predetermined criteria includes one or more of a protocol type, an application type, a domain name, a socket or port number of the data packets.

22. The base station as claimed in claim 21, wherein the circuitry is configured to determine whether the data packets are for communication via the DMN or the BPN by comparing a domain name of the data packets with one or more predetermined domain names pre-stored in a data store with an indication of whether the domain name is associated with signalling data or user data.

23. The base station as claimed in claim 21, wherein the circuitry is configured to provide a discrimination function configured to determine whether the data packets are for communication via the DMN or the BPN by comparing a socket or port number of the data packets with one or more predetermined socket or port numbers pre-stored in the data store with an indication of whether the domain name is associated with signalling data or user data.

24. The base station as claimed in claim 19, wherein the circuitry is configured to
monitor an amount of demand for signalling type data, and
establish the DMN consequent upon the demand for signalling type data exceeding a predetermined amount.

25. The base station as claimed in claim 24, wherein the circuitry is configured to
count at least one of the number of applications programs communicating the data packets for signalling data, and
initiate provision of the DMN based on a comparison of the number of signalling applications programs to a corresponding predetermined threshold.

26. The base station as claimed in claim 19, wherein the DMN is formed from a reduced bandwidth version of a bandwidth of the radio network part, and the BPN is formed from a larger portion of the radio network part.

27. An infrastructure equipment in a mobile communications network, the mobile communications network comprising a radio network part including one or more base stations for communicating the data packets to and/or receiving the data packets from mobile communications devices via a radio access interface, the infrastructure equipment for communicating the data packets to and/or receiving the data packets from the one or more base stations, the infrastructure equipment comprising:
  circuitry configured to
    determine, based on predetermined criteria, whether to communicate the data packets to the mobile communication devices via either a broadband packet network (BPN) or a dedicated messaging network (DMN);
    determine a number of the mobile communication devices which are communicating data packets for signalling type applications; and
    initiate provision of the DMN based on a comparison of the number of the mobile communications devices to a predetermined threshold, wherein
  the BPN communicates the data packets in accordance with a relatively high bandwidth and is provided by the one or more base stations of the mobile communications network,
  the DMN communicates the data packets in accordance with a relatively low bandwidth and is contemporaneously provided by the one or more base stations of the mobile communications network in a virtual carrier.

28. The infrastructure equipment as claimed in claim 27, wherein the circuitry is configured to
  parse the data packets for communication to the mobile communications devices to determine, based on the predetermined criteria, whether the data packet is for signalling data or user data,
  communicate the data packet via the DMN when the data packet is for signalling data, and
  communicate the data packet via the BPN when the data packet is for user data.

29. The infrastructure equipment as claimed in claim 28, wherein the predetermined criteria includes one or more of a protocol type, an application type, a domain name, a socket or port number of the data packets.

30. The infrastructure equipment as claimed in claim 29, wherein the circuitry is configured to provide a discrimination function configured to determine whether the data packets are for communication via the DMN or the BPN by comparing a domain name of the data packets with one or more predetermined domain names pre-stored in a data store with an indication of whether the domain name is associated with signalling data or user data.

31. The infrastructure equipment as claimed in claim 29, wherein the circuitry is configured to provide a discrimination function configured to determine whether the data packets are for communication via the DMN or the BPN by comparing a socket or port number of the data packets with one or more predetermined socket or port numbers pre-stored in a data store with an indication of whether the domain name is associated with signalling data or user data.

32. The infrastructure equipment as claimed in claim 27, wherein the circuitry is configured to
  monitor an amount of demand for signalling type data, and
  establish the DMN consequent upon the demand for signalling type data exceeding a predetermined amount.

33. The infrastructure equipment as claimed in claim 32, wherein the circuitry is configured to
  count at least one of the number of applications programs communicating the data packets for signalling data, and
  initiate provision of the DMN based on a comparison of the number of signalling applications programs to a corresponding predetermined threshold.

34. The infrastructure equipment as claimed in claim 27, wherein the DMN is formed from a reduced bandwidth version of a bandwidth of the radio network part, and the BPN is formed from a larger portion of the radio network part.

35. A method of communicating data packets to and/or receiving the data packets from mobile communications devices in a mobile communications network, the mobile communications network comprising a radio network part including one or more base stations for communicating the data packets to and/or receiving the data packets from the mobile communications devices via a radio access interface, and a core network part comprising infrastructure equipment for communicating the data packets to and/or receiving the data packets from the one or more base stations of the radio network part, the method comprising:
  providing, by the one or more base stations, a broadband packet network (BPN), the BPN communicating the data packets in accordance with a relatively high bandwidth;
  determining, by the one or more base stations, a number of the mobile communication devices which are communicating data packets for signalling type applications;
  contemporaneously providing, by the one or more base stations, a dedicated messaging network (DMN) in a virtual carrier based on a comparison of the number of the mobile communications devices to a predetermined threshold, the DMN communicating the data packets in accordance with a relatively low bandwidth; and
  determining, by circuitry based on predetermined criteria, whether to communicate the data packets via either the BPN or the DMN.

36. The method as claimed in claim 35, further comprising:
  parsing, by the circuitry, the data packets for communication to determine, based on the predetermined criteria, whether the data packet is for signalling data or user data;
  communicating the data packet via the DMN when the data packet is for signalling data; and
  communicating the data packet via the BPN when the data packet is for user data.

37. The method as claimed in claim 36, wherein the predetermined criteria includes one or more of a protocol type, an application type, a domain name, a socket or port number of the data packets.

38. The method as claimed in claim 37, further comprising:
  providing the mobile communications device with a processor, the processor being configured to provide an application programmer's interface (API) providing an interface for application programs executing on the processor,
  providing a discrimination function,
  receiving at the discrimination function from the API an indication of the application type of each of the application programs, and
  determining, using the discrimination function, whether the data packets are for communication via the DMN or the BPN based on the application type.

39. The method as claimed in claim 37, further comprising:
  comparing a domain name of the data packets with one or more predetermined domain names pre-stored in a data store with an indication of whether the domain name is associated with signalling data or user data.

40. The method as claimed in claim 37, further comprising:
comparing a socket or port number of the data packets with one or more predetermined socket or port numbers pre-stored in the data store with an indication of whether the domain name is associated with signalling data or user data.

41. The method as claimed in claim 35, further comprising:
monitoring an amount of demand for signalling type data, and
establishing the DMN consequent upon the demand for signalling type data exceeding a predetermined amount.

42. The method as claimed in claim 41, further comprising:
counting at least one of the number of applications for communicating the data packets for signalling data, and
initiating provision of the DMN consequent upon based on a comparison of the number count of the number of signalling applications.

43. The method as claimed in claim 35, wherein the DMN is formed from a reduced bandwidth version of a bandwidth of the radio network part, and the BPN is formed from a larger portion of the radio network part.

44. An apparatus for communicating data packets to and/or receiving the data packets from mobile communications devices in a mobile communications network, the mobile communications network comprising a radio network part including one or more base stations for communicating the data packets to and/or receiving the data packets from the mobile communications devices via a radio access interface, and a core network part comprising infrastructure equipment for communicating the data packets to and/or receiving the data packets from the same one or more base stations of the radio network part, wherein
the one or more base stations provide a broadband packet network (BPN), the BPN communicating the data packets in accordance with a relatively high bandwidth and contemporaneously provide a dedicated messaging network (DMN) in a virtual carrier, the DMN communicating the data packets to in accordance with a relatively low bandwidth,
the apparatus comprising:
a transmitter; and
means for determining, based on predetermined criteria, whether to communicate the data packets via either the BPN or the DMN, wherein
at least one of the one or more base stations or the infrastructure equipment is configured to
determine a number of mobile communication devices which are communicating data packets for signalling type applications, and
initiate provision of the DMN based on a comparison of the number of mobile communications devices to a predetermined threshold.

* * * * *